United States Patent [19]

Kunimune et al.

[11] Patent Number: 4,591,653
[45] Date of Patent: May 27, 1986

[54] SILICONE-POLYIMIDE PRECURSOR AND PROCESS FOR PRODUCING SAME

[75] Inventors: Kouichi Kunimune, Ichiharashi; Yoshiya Kutsuzawa, Yokohamashi; Shiro Konotsune, Yokosukashi, all of Japan

[73] Assignee: Chisso Corporation, Osaka, Japan

[21] Appl. No.: 770,223

[22] Filed: Aug. 28, 1985

[30] Foreign Application Priority Data

Oct. 29, 1984 [JP] Japan .................. 59-227272

[51] Int. Cl.$^4$ .............................. C07F 7/08; C07F 7/10
[52] U.S. Cl. ........................................... 556/419
[58] Field of Search .......................................... 556/419
[56] References Cited

U.S. PATENT DOCUMENTS

| | | | |
|---|---|---|---|
| 3,288,754 | 11/1966 | Green | 556/419 X |
| 3,325,450 | 6/1967 | Holub | 556/419 X |
| 4,088,670 | 5/1978 | Bargain et al. | 556/419 X |
| 4,306,073 | 12/1981 | Darms et al. | 556/419 |
| 4,338,426 | 7/1982 | Sato et al. | 556/419 X |

*Primary Examiner*—Paul F. Shaver
*Attorney, Agent, or Firm*—Fred Philpitt

[57] ABSTRACT

A silicone-polyimide precursor which affords a coating having a conspicuous adhesion onto silicon wafer, glass, etc. and also an improved strength, hardness, etc. after baking, and a process for producing the same are provided, which precursor is expressed by the formula (1)

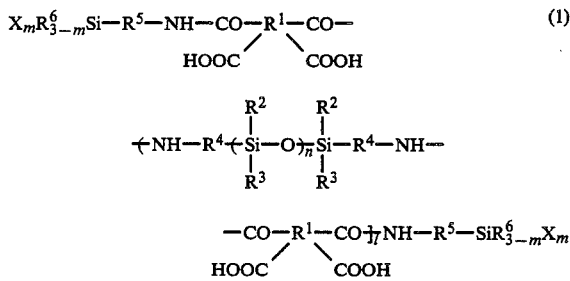

wherein $R^1$ represents a tetravalent, carbocyclic aromatic group; $R^2$, $R^3$ and $R^6$ are the same or different groups being 1~6 C alkyl, phenyl or alkyl-substituted phenyl of 7~12 C; $R^4$ and $R^5$ are the same or different groups being

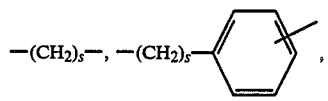

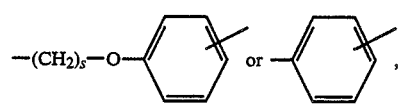

wherein s represents an integer of 1 to 4; said group

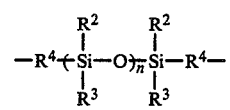

has an average formula weight of 368 to 7,968; X represents alkoxy, acetoxy, halogen atom or hydroxy; ms at both the ends of the formula (1) independently represent an integer of 1 to 3; and l represents an integer of 1 to 30; and which process comprises reacting the following compounds (2), (3) and (4):

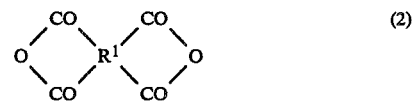

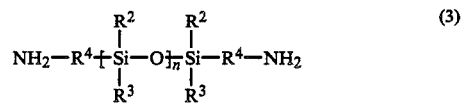

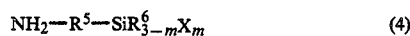

wherein the symbols $R^1$, etc. are as defined above, and the mixing ratio of (2), (3) and (4) are specified.

12 Claims, 1 Drawing Figure

SILICONE-POLYIMIDE PRECURSOR AND PROCESS FOR PRODUCING SAME

BACKGROUND OF THE INVENTION

This invention relates to a silicic polyimide precursor and a process for producing the same.

Japanese patent publication No. Sho 43-27439/1968 discloses a polyimide prepared from a silicic diamine and a diacid anhydride. However, when such a silicic polyimide is applied to protecting materials, insulating materials, etc. in the electronic field, coatings prepared therefrom and after baking have an insufficient strength, hardness, etc. On the other hand, while polyimides containing silicon in the molecule have been prepared for improving adhesion onto silicon wafer, etc., these polyimides use a silicic diamine having the greater part of the diamine component thereof replaced by an aromatic diamine (U.S. Pat. No. 3,740,305, Japanese patent application laid-open No. Sho 57-143327/1982). Coatings prepared from such polyimides and after baking have a sufficient strength, hardness, etc., but adhesion onto silicon wafer, glass or the like cannot yet be regarded as sufficient.

In view of such a present status, the main object of the present invention is to provide a compound which affords a coating having a conspicuous adhesion onto silicon wafer, glass or the like and also having an improved strength, hardness, etc. after baking, and a process for producing the same. More particularly the object is to provide a silicone-polyimide precursor suitable to use for liquid crystal aligning agent, surface-protecting film, insulating film, etc. for semiconductors; soluble in suitable solvents and when dissolved therein, affording a good workability and also a good coating-firmability; having a superior adhesion onto silicon wafer, glass or the like; and having a superior strength and hardness of coating after baking, and a process for producing the same.

SUMMARY OF THE INVENTION

The present invention in an aspect resides in:

a silicone-polyimide precursor expressed by the general formula (1)

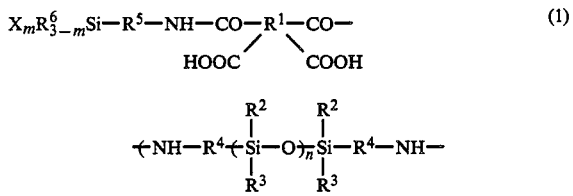

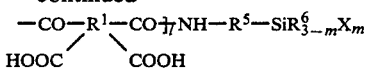

wherein $R^1$ represents a tetravalent, carbocyclic aromatic group; $R^2$, $R^3$ and $R^6$ are the same or different groups being selected from the group consisting of an alkyl group of 1 to 6 carbon atoms, phenyl group and an alkyl-substituted phenyl group of 7 to 12 carbon atoms; $R^4$ and $R^5$ are the same or different groups being selected from the group consisting of

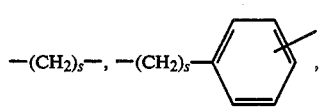

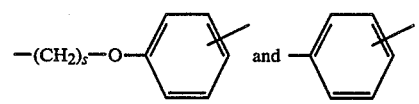

wherein s represents an integer of 1 to 4; said group

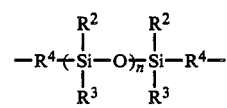

has an average formula weight of 368 to 7,968; X represents an alkoxy group, acetoxy group, a halogen atom or hydroxy group; ms at both the ends of the formula (1) independently represent an integer of 1 to 3; and l represents an integer of 1 to 30.

The present invention in another aspect resides in a process for producing a silicone-polyimide precursor, which comprises reacting a mixture consisting of A mols of one kind or a mixture of two or more kinds of tetracarboxylic acid dianhydrides expressed by the following formula (2), B mols of one kind or a mixture of two or more kinds of silicone diamines expressed by the following formula (3) and having a number average molecular weight of 400 to 8,000 as calculated from amine value and C mols of one kind or a mixture of two or more kinds of aminosilicon compounds expressed by the following formula (4), the average of the ms being 1.5 or more, in a mixing ratio of these three components approximately satisfying the following equation (5) and also satisfying the following expression (6), to obtain a silicone-polyimide precursor expressed by the following formula (1):

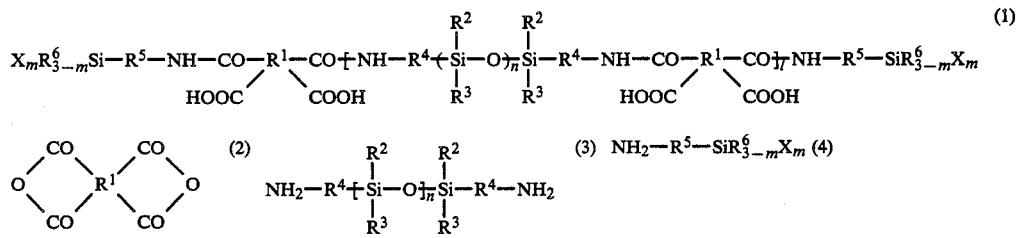

wherein $R^1$, $R^2$, $R^3$, $R^6$, $R^4$, $R^5$, X and l are as defined above and ms at both the ends of the formula (1) independently represent an integer of 1 to 3.

Examples of $R^1$ are

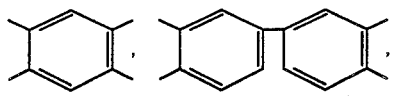

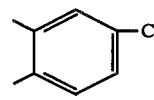

etc.

$R^2$, $R^3$ and $R^6$ are the same or different groups and examples thereof are —$CH_3$, —$C_2H_5$,

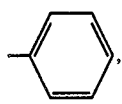

etc.

$R^4$ and $R^5$ are the same or different groups and examples thereof are

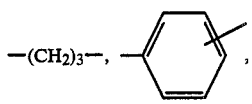

etc.

DETAILED DESCRIPTION OF PREFERRED EMBODIMENTS

Figure 1:
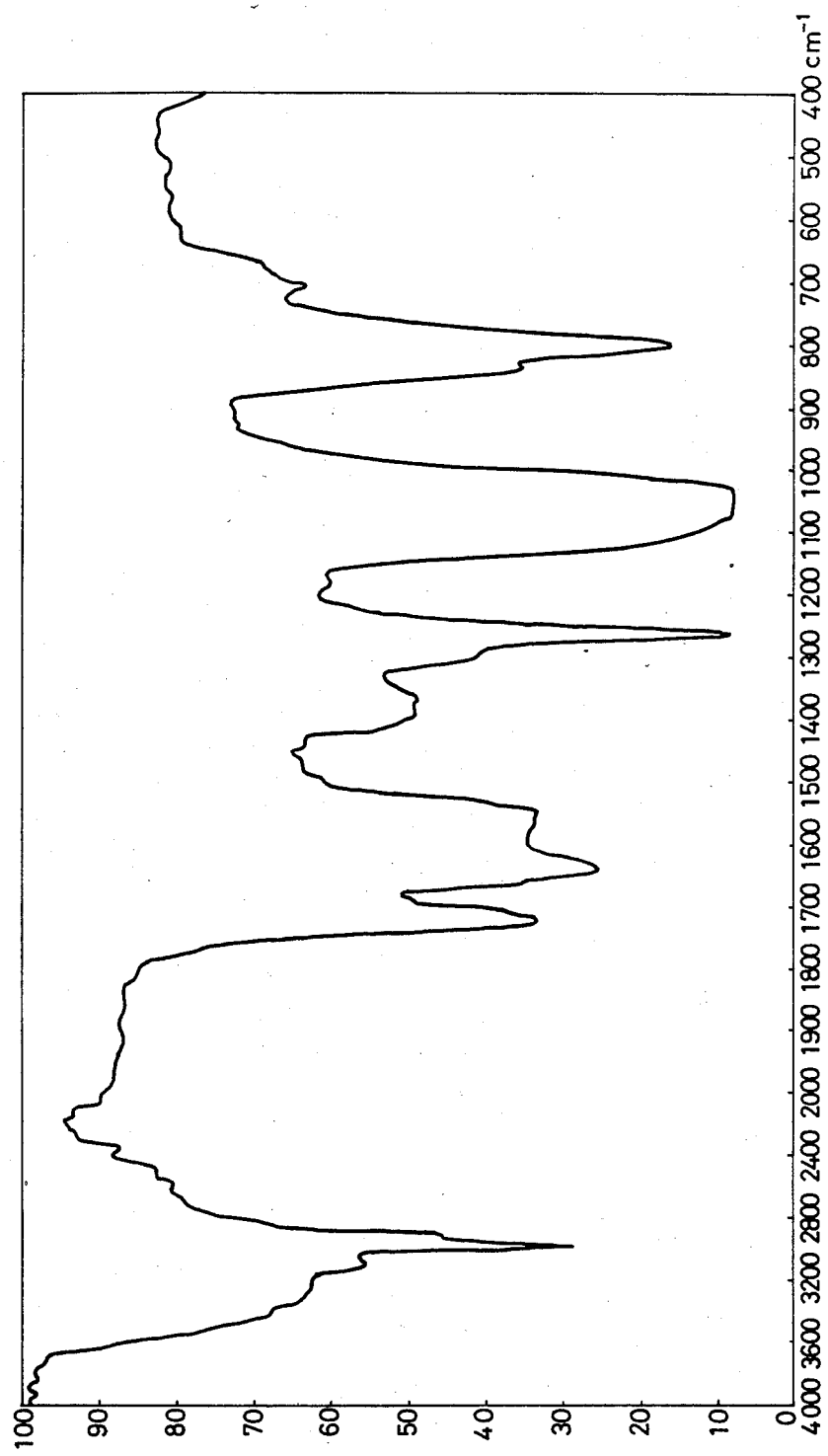
FIG. 1 shows an infrared absorption spectrum chart of a precursor obtained in Example 2.

Examples of the tetracarboxlic acid dianhydrides expressed by the formula (2) and used in the present invention are pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxylic acid dianhydride, 3,3',4,4'-benzophenonetetracarboxylic acid dianhydride, 2,3,3',4'-benzophenonetetracarboxylic acid dianhydride, 2,2',3,3'-benzophenonetetracarboxylic anhydride, bis(3,4-dicarboxyphenyl)-ether dianhydride, bis(3,4-dicarboxyphenyl)sulfone dianhydride, 1,2,5,6-naphthalenetetracarboxylic acid dianhydride, 2,3,6,7-naphthalenetetracarboxylic acid dianhydride, etc.

Concrete examples of the diamines expressed by the formula (3) are as follows:

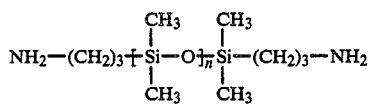

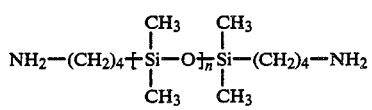

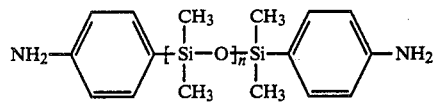

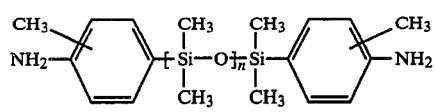

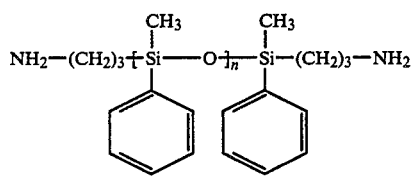

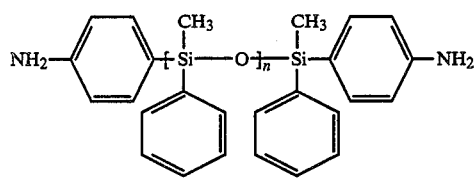

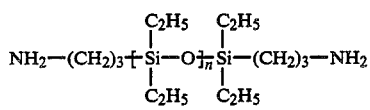

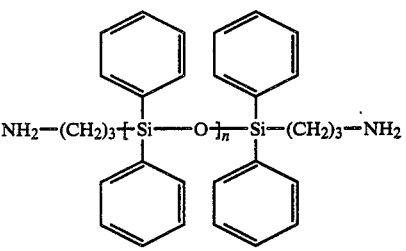

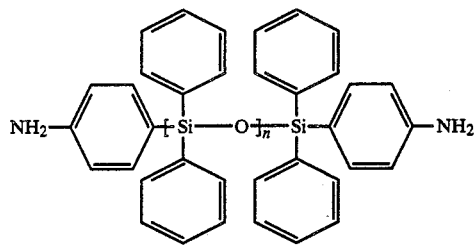

Among these silicone diamines, those having a number average molecular weight in the range of 400 to 8,000 are suitable. The n in the formula (3) is determined so that the number average molecular weight of the compound of the formula (3) may fall within the above range. If the number average molecular weight of the silicone diamine is less than 400, varnishes containing a silicone-polyimide precursor prepared from such a silicone diamine according to the same process as in the present invention have a low viscosity and have no sufficient coating properties. Contrarily if the number average molecular weight exceeds 8,000, the resulting silicone-polyimide procursor has a reduced solubility in solvents and hence it is not practical.

Concrete examples of the aminosilicon compounds expressed by the formula (4) are as follows:

NH₂—(CH₂)₃—Si(OCH₃)₃

NH₂—(CH₂)₃—Si(OC₂H₅)₃

NH₂—(CH₂)₃—Si(CH₃)(OCH₃)₂

NH₂—(CH₂)₃—Si(CH₃)(OC₂H₅)₂

NH₂—(CH₂)₃—Si(C₂H₅)(On—C₃H₇)₂

NH₂—(CH₂)₄—Si(OCH₃)₃

NH₂—(CH₂)₄—Si(OC₂H₅)₃

NH₂—(CH₂)₄—Si(CH₃)(OC₂H₅)₂

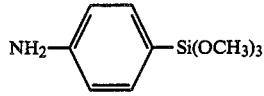

NH₂—(CH₂)₄—Si(OC₂H₅)₃

NH₂—(CH₂)₄—Si(CH₃)(OC₂H₅)₂

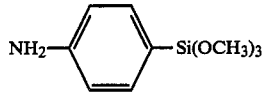

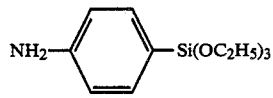

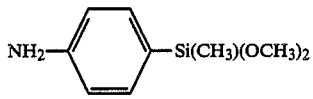

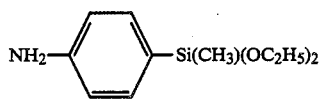

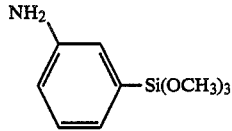

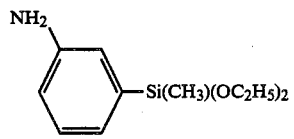

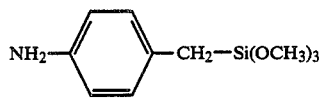

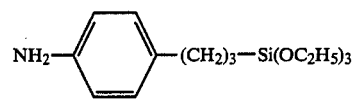

NH₂—(CH₂)₃—(CH₃)₂(OC₂H₅)

NH₂—(CH₂)₄—Si(CH₃)₂(OC₂H₅)

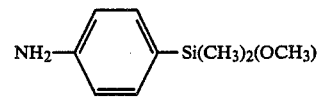

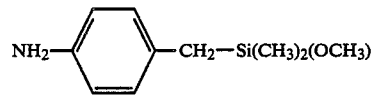

The above raw material compounds may be reacted in solvents as described below. Concrete examples of such reaction solvents are N-methylpyrrolidone, dimethylacetamide, dimethylformamide, dimethylsulfoxide, tetramethylurea, pyridine, dimethylsulfone, hexamethylphosphoroamide, methylformamide, N-acetyl-2-pyrrolidone, toluene, xylene, methyl cellosolve, ethyl cellosolve, butyl cellosolve, diethylene glycol monomethyl ether, diethylene glycol dimethyl ether, cyclopentanone, cyclohexanone, etc. These solvents may be used alone or in admixture, and further may be used in the form of a mixed solvent of these solvents with other solvents containing 30% by weight or more and less than 100% by weight of the former solvents.

Next the reaction conditions will be described.

The tetracarboxylic acid dianhydride expressed by the formula (2) may be reacted with the silicone diamine expressed by the formula (3) and the aminosilicon compound expressed by the formula (4) in the above solvents.

As shown in the equation (5), the total of amines contained in the diamine and the aminosilicon compound are reacted with two anhydride groups contained in the tetracarboxylic acid dianhydride in an approximately equivalent quantity. The term "approximately" referred to herein means that the practical value of the quantity A in the equation (5) may fall within a range of the theoretical value thereof ±10%. In this case, the quantity of the aminosilicon compound added is 10% or more of the total of mols of the aminosilicon compound and the diamine, as shown in the formula (6). If it is less than 10%, it is difficult to obtain a coating having a sufficient hardness and strength.

The raw material compounds expressed by the formulas (2), (3) and (4) may be dissolved in the above solvents and subjected to the reaction of the acid anhydride groups with the amines to produce the above amic acid compound expressed by the formula (1).

The reaction temperature is suitably in the range of 0° to 60° C., and at a reaction time of about 0.2 to 6 hours, the reaction proceeds relatively rapidly.

The concentration of the raw material compounds at the time of the reaction has no particular limitation, but it is practically in the range of about 5 to 60% by weight on view of mixing, stirring, heat removal, economy, etc.

In the case where the reaction fluid containing the thus produced silicone-polyimide precursor is used as a coating fluid for electronic materials, it is possible, if necessary, in advance of its use to remove ionic compounds by means of a solid adsorbent and further remove fine solid impurities by means of a filter of 1 μm or less. The concentration of the coating fluid is determined depending on the coating thickness required, but it is preferably 60% or less and a range of 0.3 to 25% is particularly practical. The concentration may be adjusted by diluting the fluid by the above solvents or other solvents.

In addition, in the case where the silicone-polyimide precursor obtained according to the present invention is used as a coating material for electronic materials, the average value of ms in the coating material is preferred to be 1.5 or more. For this purpose, when a compound expressed by the formula (4) wherein m=1 is used in the production of the silicone-polyimide precursor, a compound of the formula wherein m=2 or a compound of the formula wherein m=3 may be at the same time used to make the average value of ms 1.5 or more. Alternatively, in the case where a silicone-polyimide precursor having an average value of ms less than 1.5 is used, a silicone-polyimide precursor having an average value of ms greater than 1.5 may be at the same time made present in the coating material for electronic materials to thereby make the average value of ms 1.5 or greater as the whole of the coating material for electronic materials.

The coating fluid may be uniformly applied onto silicone wafer, glass plate, etc. by means of spinner or the like, followed by baking to form a hard coating.

The baking conditions somewhat vary depending on solvent used, coating thickness, kind of polymer, etc., but those of 100° to 300° C. and about 1 to 3 hours may be sufficient.

As to the effectiveness of the present invention, by limiting the molecular weight of the silicone diamine expressed by the formula (3), it has become possible to provide a coating fluid for electronic materials containing a polymer having good coating properties and being soluble in many solvents, and further by employing an aminosilicon compound of the formula (4) satisfying both the expressions (5) and (6), it has become possible to provide a coating fluid containing the compound of the formula (1) of the present invention and thus affording a coating having a sufficient hardness and strength.

The coating fluid for electronic materials using the silicone-polyimide precursor affords a coating having a conspicuous adhesion onto silicon wafer, glass plate, etc. since the precursor constituting the fluid contains many silicon atoms in the molecule; hence its practical effectiveness is great. Further, since the coating fluid for electronic materials using the precursor obtained according to the present invention contains the aminosilicon compound expressed by the formula (4) in the form of a component constituting the polymer, it may be presumed that this component causes an intermolecular condensation at the time of baking to form a coating having a three-dimensional structure and also form a higher molecular weight substance. Thus the coating fluid for electronic materials using the precursor of the present invention affords a coating having a practically sufficient hardness and strength in spite of a high content of the siloxane component therein which is originally of a soft substance. Further, another effectiveness of the aminosilicon compound of the present invention is that imidization is effected at lower temperatures and in shorter times as compared with a polyimide precursor obtained from only the compounds of the formulas (2) and (3).

The above solution of the precursor of the present invention can be said to be suitable as a coating fluid for electronic materials such as liquid crystal aligning agent, surface-protecting film for semiconductors, surface-protecting film for color filters, insulating film between multilayer interconnections, etc.

EXAMPLE 1

A 1 l flask equipped with a stirrer, a dropping funnel, a thermometer and a nitrogen gas-purging means was fixed in a cold water. After purging the inside of the flask with nitrogen gas, dewatered, purified cyclohexanone (500 ml), 3-aminopropyltriethoxysilane (27.544 g, 0.124 mol) and polydimethylsiloxane terminated with 3-aminopropyls at both the ends thereof having a number average molecular weight of 1,020 (63.446 g, 0.0622 mol) were fed into the flask and together dissolved with stirring. Powdery pyromellitic acid dianhydride (27.135 g, 0.124 mol) was fed to a dropping funnel, through which it was gradually fed into the flask over 30 minutes to continue reaction, during which the reaction temperature was 5° to 10° C., followed by continuing the reaction at this temperature for 2 hours, thereafter raising the temperature and further continuing the reaction at 25° to 30° C. for one hour to obtain a silicone-polyimide precursor of the present invention in the form of a pale-yellow, transparent fluid having a rotational viscosity at 25° C. of 27 cp.

COMPARATIVE EXAMPLE 1

Reaction was carried out employing the same apparatus and manner as in Example 1 except that 3-aminopropyltriethoxysilane (4.295 g, 0.0194 mol) and polydimethylsiloxane terminated with 3-aminopropyls at both the ends thereof (109.599 g, 0.00970 mol) having a number average molecular weight of 11,300 were dissolved in cyclohexanone (500 ml), followed by adding to the resulting solution, pyromellitic acid dianhydride (4.231 g, 0.0194 mol) over 30 minutes while keeping the reaction fluid at 5° to 10° C., carrying out reaction at this temperature for 2 hours, thereafter raising the temperature and further carrying out the reaction at 25° to 30° C. for one hour. As a result, however, a rubbery polymer was deposited in the flask and no uniform solution was obtained.

It is apparent from this Comparative example that when the component of the above formula (3) used as one of the raw materials has a number average molecular weight greater than 8,000, a solvent-insoluble polymer is formed.

COMPARATIVE EXAMPLE 2

Reaction was carried out employing the same apparatus and manner as in Example 1 except that 3-aminopropyltriethoxysilane (24.200 g, 0.109 mol) and 1,3-bis(3-aminopropyl)-1,1,3,3-tetramethyldisiloxane (molecular weight: 248) (40.743 g, 0.164 mol) were dissolved in butyl cellosolve (500 ml), followed by adding to the resulting soluton, pyromellitic acid dianhydride (47.682 g, 0.219 mol) over 30 minutes while keeping the reaction fluid at 5° to 10° C., carrying out reaction at this temperature for 2 hours, thereafter raising the temperature and further carrying out the reaction at 25° to 30° C. for one hour to obtain a pale-yellow, transparent fluid having a rotational viscosity at 25° C. of 10 cp.

It is apparent from this Comparative example that when the component of the above formula (3) used as one of the raw materials has a number average molecular weight less than 400, a polymer having too small a rotational viscosity (i.e. having inferior coating properties) is formed.

EXAMPLE 2

Reaction was carried out employing the same apparatus and manner as in Example 1 except that 3-aminopropyltriethoxysilane (15.780 g, 0.0713 mol) and polydimethylsiloxane terminated with 3-aminopropyls at both the ends thereof having a number average molecular weight of 615 (65.751 g, 0.107 mol) were dissolved in butyl cellosolve (500 ml), followed by adding to the resulting solution, pyromellitic acid dianhydride (31.094 g, 0.143 mol) over 40 minutes while keeping the reaction fluid at 3° to 8° C., and carrying out reaction at this temperature for 4 hours to obtain a pale-yellow, transparent fluid having a rotational viscosity at 25° C. of 25 cp. An infrared absorption spectrum (KBr) chart of the precursor obtained in this Example is shown in FIG. 1.

EXAMPLE 3

Reaction was carried out employing the same apparatus and manner as in Example 1 except that p-aminophenyltrimethoxysilane (13.560 g, 0.0636 mol) and polydimethylsiloxane terminated with 3-aminopropyls at both the ends thereof having a number average molecular weight of 615 (39.096 g, 0.0636 mol) were dissolved in cyclohexanone (500 ml), followed by adding to the resulting solution, benzophenonetetracarboxylic acid dianhydride (30.727 g, 0.0954 mol) over 30 minutes while keeping the reaction fluid at 10° to 15° C., and carrying out reaction at this temperature for one hour and further at 45° to 50° C. for one hour to obtain a uniform solution as a pale-yellow, transparent fluid having a rotational viscosity at 25° C. of 22 cp.

EXAMPLE 4

Reaction was carried out employing the same apparatus and manner as in Example 1 except that 3-aminopropyltriethoxysilane (36.862 g, 0.166 mol) and polydimethylsiloxane terminated with 3-aminopropyls at both the ends thereof having a number average molecular weight of 615 (51.197 g, 0.0832 mol) were mixed and dissolved in a mixed solvent of N-methyl-2-pyrrolidone (250 ml) with methyl cellosolve (250 ml), followed by adding to the resulting solution, pyromellitic acid dianhydride (36.316 g, 0.166 mol) over 30 minutes while keeping the reaction fluid at 3° to 8° C., and carrying out reaction at the temperature for 2 hours and further at 25° to 30° C. for one hour to obtain a pale-yellow, transparent fluid having a rotational viscosity at 25° C. of 18 cp.

COMPARATIVE EXAMPLE 3

Reaction was carried out employing the same apparatus and manner as in Example 1 except that polydimethylsiloxane terminated with 3-aminopropyls at both the ends thereof having a number average molecular weight of 615 (64.809 g, 0.105 mol) was dissolved in a mixed solvent of N-methyl-2-pyrrolidone (250 ml) with methyl cellosolve (250 ml), followed by adding to the resulting solution, pyromellitic acid dianhydride (22.986 g, 0.105 mol) over 30 minutes while keeping the reaction fluid at 3° to 8° C., and carrying out reaction at this temperature for 2 hours and further at 25° to 30° C. for one hour to obtain a pale-yellow, transparent fluid having a rotational viscosity at 25° C. of 19 cp.

EXAMPLE 5

Reaction was carried out employing the same apparatus and manner as in Example 1 except that 3-aminopropylmethyldiethoxysilane (6.063 g, 0.0317 mol) and polydimethylsiloxane terminated with 3-aminopropyls at both the ends thereof having a number average molecular weight of 4,200 were dissolved in butyl cellosolve (500 ml), followed by adding to the resulting solution, pyromellitic acid dianhydride (6.910 g, 0.0317 mol) over 10 minutes while keeping the reaction fluid at 3° to 8° C., and carrying out reaction at this temperature for 2 hours and further at 25° to 30° C. for one hour to obtain a pale-yellow, transparent fluid having a rotational viscosity at 25° C. of 36 cp.

EXAMPLE 6

Reaction was carried out employing the same apparatus and manner as in Example 1 except that 3-aminopropyltrimethoxysilane (5.632 g, 0.0314 mol) and polydimethylsiloxane terminated with 3-aminopropyls at both the ends thereof having a number average molecular weight of 615 (38.660 g, 0.0629 mol) were dissolved in butyl cellosolve (500 ml), followed by adding to the resulting solution, pyromellitic acid dianhydride (17.139 g, 0.0786 mol) over 20 minutes while keeping the reaction fluid at 3° to 8° C., and carrying out reaction at this temperature for 2 hours and further at 25° to 30° C. for one hour to obtain a pale-yellow, transparent fluid having a rotational viscosity at 25° C. of 30 cp.

REFERENCE EXAMPLE 1

The following coating tests were carried out:

The respective reaction fluids obtained in the above Examples and Comparative examples were filtered through a filter of 1 μm, applied onto a glass plate by means of a spinner and baked at 150° to 250° C. for 2 hours to observe the condition of the resulting coatings. The results are shown in Table 1.

TABLE 1

| Coating test No. | Coating fluid | Baking temperature | | |
|---|---|---|---|---|
| | | 150° C. | 200° C. | 250° C. |
| 1 | Example 1 | O | O | O |
| 2 | Example 2 | O | O | O |
| 3 | Example 3 | O | O | O |
| 4 | Example 4 | O | O | O |
| 5 | Example 5 | O | O | O |
| 6 | Example 6 | O | O | O |
| 7 | Compar. 2 ex. | X | X | X |
| 8 | Compar. 3 ex. | Δ | Δ | Δ |

Note: In the above Table, the symbols O, Δ and X represent the following meanings:
O: A uniform coating having a sufficient strength is formed, and its adhesion onto glass is firm.
Δ: A uniform coating is formed, but it is soft and readily injured.
X: No uniform coating is formed.

What we claim is:

1. A silicone-polyimide precursor expressed by the general formula (1)

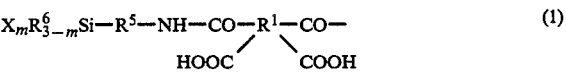  (1)

-continued

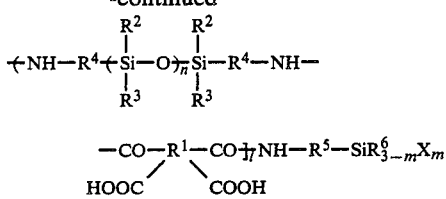

$$-CO-R^1-CO)_{l}NH-R^5-SiR^6_{3-m}X_m$$
with HOOC and COOH branches wherein $R^1$ represents a tetravalent, carbocyclic aromatic group; $R^2$, $R^3$ and $R^6$ are the same or different groups being selected from the group consisting of an alkyl group of 1 to 6 carbon atoms, phenyl group and an alkyl-substituted phenyl group of 7 to 12 carbon atoms; $R^4$ and $R^5$ are the same or different groups being selected from the group consisting of

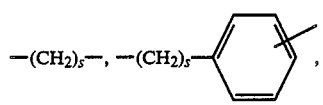

wherein s represents an integer of 1 to 4; said group

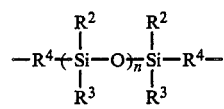

has an average formula weight of 368 to 7,968; X represents an alkoxy group, acetoxy group, a halogen atom or hydroxy group; ms at both the ends of the formula (1) independently represent an integer of 1 to 3; and l represents an integer of 1 to 30.

2. A silicone-polyimide precursor according to claim 1
wherein said $R^1$ represents a group represented by

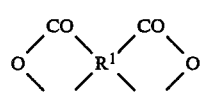

3. A silicone-polyimide precursor according to claim 1
wherein said $R^2$, $R^3$ and $R^6$ are the same or different groups being selected from the group consisting of —CH$_3$,

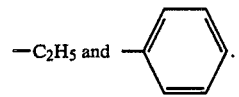

4. A silicone-polyimide precursor according to claim 1
wherein said $R^4$ and $R^5$ are the same or different groups being —(CH$_2$)$_3$— or

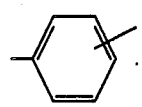

5. A process for producing a silicone-polyimide precursor which comprises
reacting a mixture consisting of A mols of one kind or a mixture of two or more kinds of tetracarboxylic acid dianhydrides expressed by the following formula (2), B mols of one kind or a mixture of two or more kinds of silicone diamines expressed by the following formula (3) and having a number average molecular weight of 400 to 8,000 as calculated from amine value and C mols of one kind or a mixture of two or more kinds of aminosilicon compounds expressed by the following formula (4), the average of the ms being 1.5 or more,
in a mixing ratio of these three components approximately satisfying the following equation (5) and also satisfying the following expression (6),
to obtain a silicone-polyimide precursor expressed by the following formula (1)

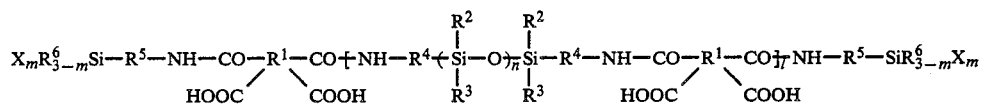  (1)

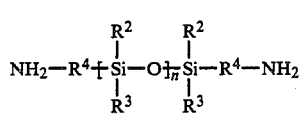 (2)

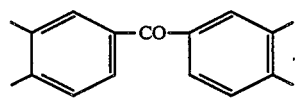 (3)  NH$_2$—R$^5$—SiR$^6_{3-m}$X$_m$ (4)

2A = 2B + C  (5)   $0.1 \leq \frac{C}{B+C} < 1$  (6)

wherein $R^1$ represents a tetravalent, carbocyclic aromatic group; $R^2$, $R^3$ and $R^6$ are the same or different groups being selected from the group consisting of an alkyl group of 1 to 6 carbon atoms, phenyl group and an alkyl-substituted phenyl group of 7 to 12 carbon atoms, respectively; $R^4$ and $R^5$ are the same or different groups being selected from the group consisting of

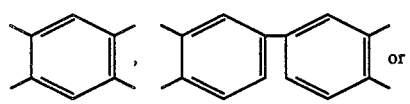

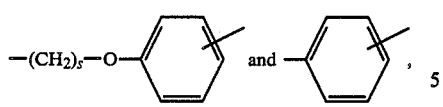

respectively wherein s represents an integer of 1 to 4; said group

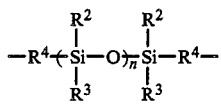

has an average formula weight of 368 to 7968; X represents an alkoxy group, acetoxy group, a halogen atom or hydroxy group; ms at both the ends of the formula (1) independently represent an integer of 1 to 3; and l represents an integer of 1 to 30.

6. A process for producing a silicone-polyimide precursor according to claim 5, wherein said $R^1$ is a group expressed by

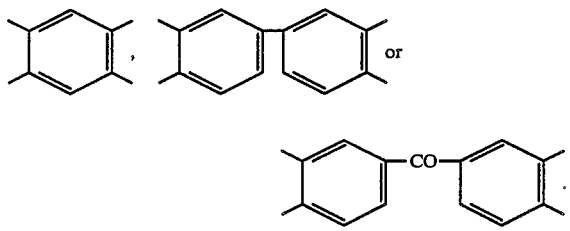

7. A process for producing a silicone-polyimide precursor according to claim 5, wherein said $R^2$, $R^3$ and $R^6$ are the same or different groups being selected from the group consisting of —$CH_3$,

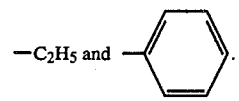

8. A process for producing a silicone-polyimide precursor according to claim 5 wherein said $R^4$ and $R^5$ are the same or different groups being —$(CH_2)_3$— or 9. A process for producing a silicone-polyimide precursor according to claim 5 wherein said reaction is carried out in the presence of a solvent.

10. A process for producing a silicone-polyimide precursor according to claim 9 wherein the concentration of the raw material compounds (2), (3) and (4) in said reaction is in the range of 5 to 60% by weight.

11. A process for producing a silicone-polyimide precursor according to claim 5 wherein said reaction is carried out at a temperature of 0° to 60° C.

12. A process for producing a silicone-polyimide precursor according to claim 5 wherein said reaction is carried out for a time of 0.2 to 6 hours.

* * * * *